Patented Aug. 26, 1924.

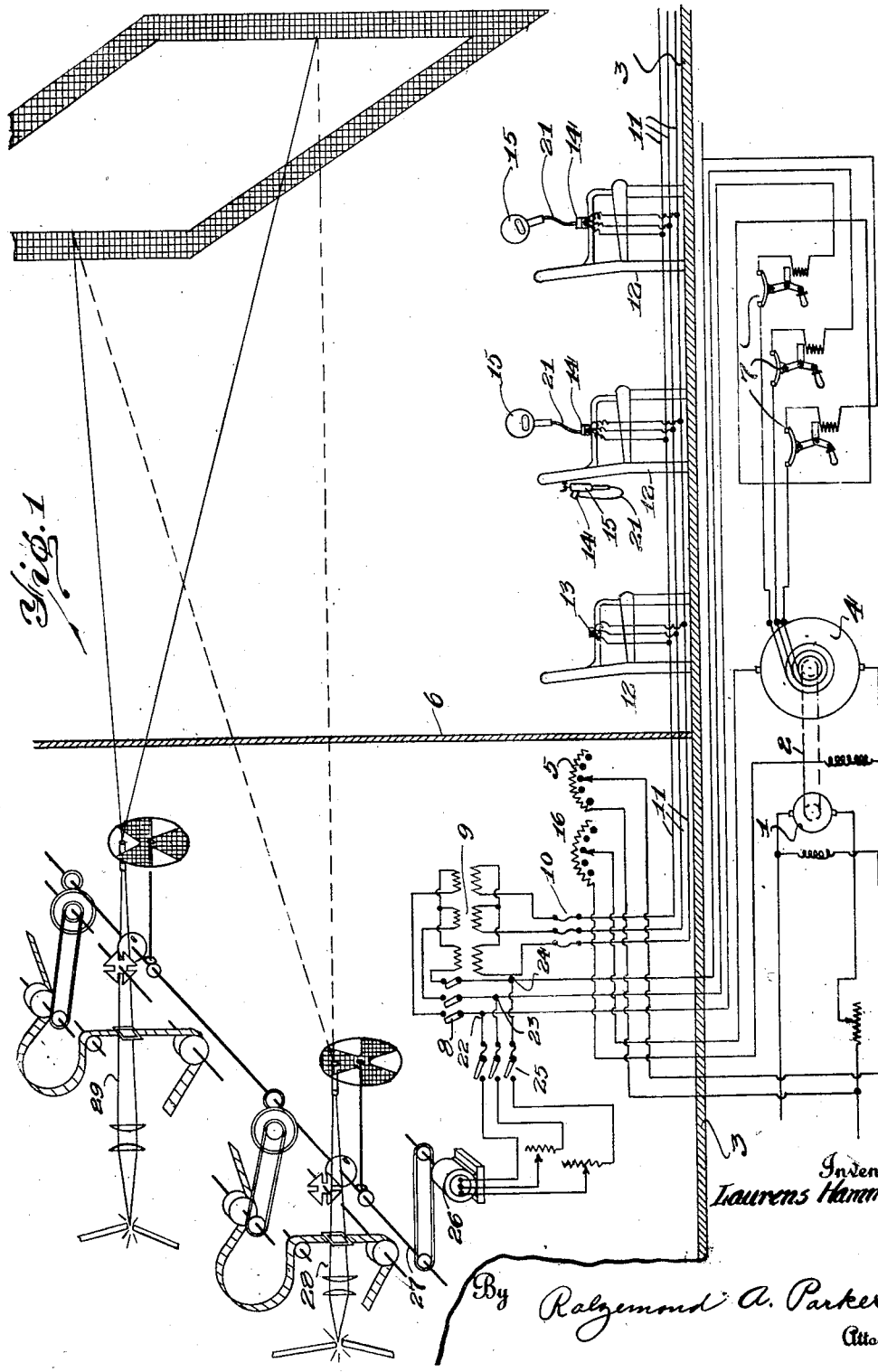

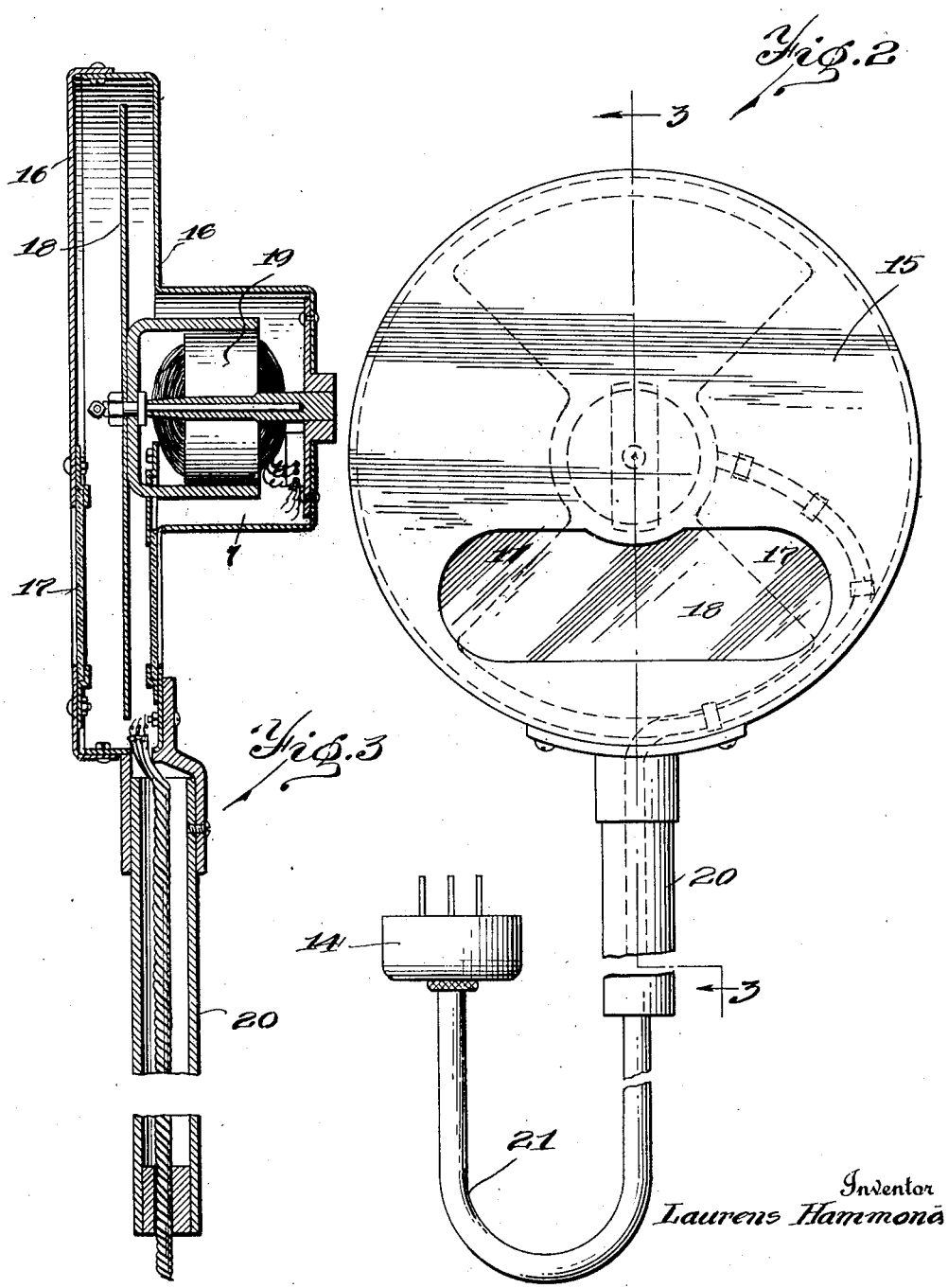

1,506,524

UNITED STATES PATENT OFFICE.

LAURENS HAMMOND, OF NEW YORK, N. Y., ASSIGNOR TO THE TELEVIEW CORPORATION, OF CHICAGO, ILLINOIS, A CORPORATION OF ILLINOIS.

STEREOSCOPIC MOTION-PICTURE DEVICE.

Application filed May 29, 1922. Serial No. 564,406.

*To all whom it may concern:*

Be it known that I, LAURENS HAMMOND, a citizen of the United States, residing at New York, county of New York, State of New York, have invented a certain new and useful Improvement in Stereoscopic Motion-Picture Devices, and declare the following to be a full, clear, and exact description of the same, such as will enable others skilled in the art to which it pertains to make and use the same, reference being had to the accompanying drawings, which form a part of this specification.

My invention relates to apparatus and the disposition thereof for enabling a theatre audience or a like group of people to view motion pictures or still pictures projected on a screen with stereoscopic effect.

The process by which the projected pictures appear to have stereoscopic effect is described in my co-pending application, No. 448,963 and portions of the apparatus employed are described in my co-pending application No. 519,334.

Briefly described, the process consists of projecting on a viewing screen, alternately and in rapid succession, views of the same scene photographed from two slightly different points of view, these views corresponding to the right and left views well-known in stereoscopic photography. The right and left eye-view pictures are projected on substantially the same spot on the screen but cannot be made to superimpose exactly because they are slightly dissimilar with the result that when these pictures are viewed with the naked eye they appear jumbled and not clear.

To view these pictures each person in the audience is provided with an electrically-operated instrument comprising in part a shutter which operates in such a way that the right and left eye views of an observer looking through the instrument are cut off one at a time and in rapid succession in timed relationship with the picture projection and in such a manner that the observer's right eye sees only the right-view projected photograph, and his left eye sees only the left-view projected photograph. To the observer's view the projected pictures then appear clear and take on an appearance of solidity and likeness to the bi-focal sight he is accustomed to in real life.

The general process described is not new, but is known as the "eclipse" method of viewing stereoscopic pictures. It has never been undertaken commercially, so far as I am aware, but there have been many ways proposed for accomplishing the result, which to be successful requires that the shutters in the individual viewing instruments should exactly synchronize in their operation with the shutters on the projecting apparatus.

In all previous devices of this nature with which I am familiar, attempts have been made to operate the individual viewing instruments electrically from a distributor, or like device fastened to the projection apparatus. This has given rise to difficulties which will appear more fully later.

In the apparatus which I have invented and built, I operate the shutters in the individual viewing instruments by means of alternating current from a single and independent source of alternating current supply, the voltage and frequency of which may be varied at the will of the operator. The projection equipment for throwing the pictures on the screen is entirely independent from the operation of the individual viewing instrument, and none of this equipment need be operated in order to make the viewing instrument shutters operate. This will be made more clear by reference to the drawings which show the electrical wiring diagram employed.

The above and other objects, together with details of construction and operation will more fully appear from the following description, appended claims and accompanying drawings, in which:

Figure 1 is a view, partially in diagram, of a theatre equipped with my improved apparatus for picture projection.

Fig. 2 is an elevation, partially broken away, of one of the viewing devices.

Fig. 3 is a cross-sectional view taken on the line 3—3 of Fig. 2.

I provide a variable speed motor 1, which may be situated in the basement, beneath the floor 3, or other out-of-the-way place in the theatre and which is made to drive, by means of a belt 2, a three-phase, self-exciting alternating current generator 4. The speed of the motor may be varied by means of a field rheostat 5, which rheostat may be conveniently located in the projection booth, which booth is indicated diagrammatically by the solid line 6. When the speed of the motor 1 is varied, the speed of the alternating current generator 4 is varied in consequence, as is also the frequency of the alternating current which the generator supplies. The field rheostat 16 is connected in the alternator field to keep the alternating current supply at a constant voltage when its frequency is varied. This alternating current passes through circuit breaker 7 and is led to the three-pole switch 8, which switch may also be conveniently located within the projection booth. When this switch 8 is closed, the current passes on to the step-down transformers 9. The secondary winding of these transformers is connected through fuses 10 to the three wire feeder 11 which runs throughout the theatre and is provided at convenient places in proximity the several seats 12, with suitable electric contacts or connections 13. These connections 13 are here shown as located on the seat arms and are made in the form of three-wire plugs into which may be inserted the corresponding electric plug 14 carried by the individual viewing instruments 15.

These viewing instruments are provided, one for each spectator, and are individually electrically driven by current supplied through the connections 13.

An instrument of this character is described in detail in my patent application, Serial No. 519,334, filed Dec. 2, 1921.

Briefly described, one of these instruments 15 comprises a casing 16 provided with a clear vision portion 17 through which portion a spectator holding such instrument may view the screen with both eyes. Mounted within the casing for rotation is a shutter 18 adapted to travel during its rotation across such clear vision portion, thereby shutting off the vision first of one eye of the observer, then of the other, in rapid succession. This shutter is driven by a small synchronous electric motor 19 likewise supported within the casing, which motor is of such a character that it is self-starting when the proper alternating current is supplied to it under normal frequency for operation and when so started it may come into exact synchronism with the alternating current supply, in this case, the alternator 3. The instrument is further provided with handle 20 and a suitable length of flexible cord 21 and is adapted, as described, for detachable connection with the contact positioned on the seat arm, so as to be driven by current from the three-wire feeder 11 and under control of the alternator.

Referring to Fig. 1 of the drawings, it will be seen that when the alternator 3 is running the viewing instruments 15 will commence to operate as soon as the switch 8 is closed. Connections from the points 22, 23 and 24 lead to the three-pole fuse switch 25. When this switch is closed the motor 26 commences to operate on current supplied from the alternator and under the control thereof.

This motor 26 is used to drive projection apparatus or other projection equipment preferably located within the booth, and is a self-starting synchronous motor. A type I prefer to use is an induction squirrel-cage motor having salient magnetic poles which cause the motor to come into synchronous step with the source of alternating current supply, in this case the alternator 3, but in one of three certain predetermined positions. This type of motor is well-known and will not be further described.

This motor drives a main shaft 27 at a timed rate of speed, which shaft is shown as driving two well-known Powers projectors 28 and 29, described in my application Serial No. 448,963, filed March 2, 1921 and which project right and left eye view pictures in alternate succession on a viewing screen 30. If desired, a plurality of independent motors 26 may be used to drive various projection machines, such as motion picture projectors, slide-projecting stereopticons and the like, provided only that they are connected through the same points 22, 23 and 24 to be driven by the alternator.

When it is desired to project pictures for stereoscopic viewing, each set in the theatre being provided with a viewing instrument and the spectators being present, the operator will proceed as follows:

The motor 1 is started, driving the alternator 3. The switch 8 is closed whereupon the shutter 18 in each spectator's viewing instrument 15 begins to operate in synchronism with the supplied alternating current. The picture projection apparatus being ready, the operator closes the switch 25 which starts the motor 26 and consequently the picture projection. The individual viewing instruments and the projecting machines being in synchronism with the alternator 3, it follows that they are in synchronism with each other and that the desired synchronism between picture projection and viewing apparatus is obtained.

To run the main picture projectors faster or slower, the operator varies the resistance through the rheostat 4, slowing down or speeding up the motor 1 and the alternator 3. The viewing instruments 15, motor 26 and all speeds remain in proportion, the performance continuing without interruption. Should an individual viewing instrument be broken or fail to operate, an usher will replace it by disconnecting it at the plug and supplying the spectator with another instrument which, when similarly connected, will immediately pick up the step and begin to operate in synchronism with the running apparatus, the performance continuing while this is being accomplished.

What I claim is:

1. In connection with a process of exhibiting motion pictures with stereoscopic effect wherein each spectator is provided with an electrically operated viewing instrument, in combination, projection apparatus adapted to project each picture in the movement series alternately and more than once, individual viewing instruments for each spectator through which such spectator may view the projected pictures with resulting stereoscopic effect, and an alternating current generator the current of which operates said apparatus and instruments in timed relationship.

2. In connection with a process of projecting pictures on a viewing screen and viewing such projected pictures with resulting stereoscopic effect wherein each spectator is provided with an individual electrically operated viewing device, in combination, electrically-driven projection apparatus, electrically-driven individual viewing instruments, one for each spectator, and a common source of alternating current supply for operating the said apparatus and instruments in timed relationship.

3. In connection with a process of stereoscopically exhibiting pictures wherein the spectators are each provided with an individual electrically-operated viewing instrument through which such spectator may view the projected pictures on a viewing screen, in combination, electrically-driven projection apparatus, electrically-driven viewing apparatus, a source of alternating current for driving both projection and viewing apparatus, and suitable electrical connections for permitting the viewing apparatus to be operated independently of the projection apparatus and means for varying the speed of the projection apparatus and viewing instruments through a device operable to vary the frequency of the supplied alternating current from said source of supply.

4. The combination in a theatre having a plurality of seats for spectators and equipped with apparatus for permitting a plurality of persons to concurrently view projected pictures with resulting stereoscopic effect, of a source of alternating current supply, a viewing screen picture projection apparatus adapted to project right and left eye view pictures on the viewing screen alternately, said projection apparatus electrically driven and controlled by current from said source of alternating current supply, an independent electric circuit energized by current from said source of supply, a plurality of individual viewing instruments disposed in said circuit one in proximity each spectator's seat through each of which a spectator may view said projected pictures stereoscopically, said instruments driven and controlled by current from said source of supply in synchronism with the operation of the picture projection apparatus.

5. The combination, in apparatus for exhibiting moving pictures with resulting stereoscopic effect to a plurality of spectators concurrently, a viewing screen electrically-driven picture projection apparatus adapted to project right and left eye views of each picture in the movement series in alternate succession on the viewing screen and provided with mechanism for shifting the film to project successive pictures in the movement series, a plurality of individual electrically-driven optical instruments, one for each spectator, through each of which a spectator may bifocally view the projected pictures first with one eye then with the other, a common source of alternating current connected with the viewing instruments and the projecting apparatus to drive the viewing instruments in timed relationship with the projecting apparatus and with the mechanism for shifting the film.

6. The combination, in apparatus for exhibiting pictures with resulting stereoscopic effect to a plurality of persons concurrently, of a source of alternating current supply, electrically-driven projection apparatus operating on current from said source of supply, an electrical circuit energized by current from said source of supply, a plurality of contacts positioned in said circuit and individual electrically-driven optical instruments, through each of which a spectator may view the projected pictures stereoscopically, said instruments being capable of detachable interchangeable connection with said contacts and each provided with a synchronous self-starting motor capable of operation on current from said source of supply.

7. The combination, in apparatus for exhibiting pictures with resulting stereoscopic effect to a plurality of persons concurrently, of an alternating current generator, the driven speed of which may be varied, projection apparatus driven by a synchronous electric motor the current for which is supplied by said generator and the speed of which is controlled by the regulated frequency thereof, an electrical circuit provided with a plurality of electrical connections and the current for which circuit is supplied by said generator and individual electrically-operated viewing instruments, one for each person and through which such person may view the projected pictures stereoscopically, said instruments adapted for detachable connection with the electrical connections of said circuit and capable of operation on current therefrom.

8. In a theatre equipped for exhibiting motion pictures to a plurality of spectators with resulting stereoscopic effect, a viewing screen, a plurality of seats for spectators, picture projecting apparatus adapted to project in alternate succession right and left eye views of each picture in the movement series on the viewing screen and provided with mechanism for shifting the film to bring separate pictures in the movement series into position for projecting, an optical instrument adjacent each spectator's seat through which the spectator may view the projected pictures adapted to obstruct the sight first of one eye then the other, an alternating current generator capable of regulation as to frequency of supplied alternating current connected with each viewing instrument and with the projecting apparatus to drive the viewing instruments in a determined order of timed relationship with the picture projecting apparatus and with the shifting of the film.

In testimony whereof, I sign this specification.

LAURENS HAMMOND.